United States Patent [19]

Ling

[11] Patent Number: 5,297,161
[45] Date of Patent: Mar. 22, 1994

[54] METHOD AND APPARATUS FOR POWER ESTIMATION IN AN ORTHOGONAL CODED COMMUNICATION SYSTEM

[75] Inventor: Fuyun Ling, Jamaica Plains, Mass.

[73] Assignee: Motorola Inc., Schaumburg, Ill.

[21] Appl. No.: 906,321

[22] Filed: Jun. 29, 1992

[51] Int. Cl.[5] .................... H04B 7/216; H04J 13/00
[52] U.S. Cl. .................................. 375/1; 455/52.1; 455/69
[58] Field of Search ............... 375/1; 324/76.33; 455/521, 52.2, 52.3, 69

[56] References Cited

U.S. PATENT DOCUMENTS

| | | |
|---|---|---|
| 4,261,054 | 4/1981 | Scharla-Nielsen .............. 455/69 X |
| 4,811,357 | 3/1989 | Betts et al. . |
| 4,901,307 | 2/1990 | Gilhousen et al. . |
| 5,056,105 | 10/1991 | Darmon et al. . |
| 5,056,109 | 10/1991 | Gilhousen et al. . |
| 5,101,501 | 3/1992 | Gilhousen et al. . |
| 5,103,459 | 4/1992 | Gilhousen et al. . |
| 5,109,390 | 4/1992 | Gilhousen et al. . |
| 5,159,608 | 10/1992 | Falconer et al. .................... 375/1 |

OTHER PUBLICATIONS

Dixon, Robert C., *Spread Spectrum Systems 2nd Ed.*, John Wiley & Sons, New York, N.Y., 1984 Chapters 1 & 2, pp. 1–55.

Sklar, Bernard, *Digital Communications: Fundamentals and Applications*, Prentice Hall, Englewood Cliffs, N.J., 1988, Chapters 5 & 6 pp. 245–380.

"Two Classes of Convolution Codes Over GF(q) for q-ary Orthogonal Signaling", William E. Ryan and Stephen G. Wilson, *IEEE Transactions on Communications*, vol. 39, No. 1 (Jan. 1988), pp. 30–40.

"On the System Design Aspects of Code Division Multiple Access (CDMA) Applied to Digital Cellular and Personal Communication Networks", Allen Salmasi/Klein S. Gilhousen, *Proceedings of 41st Vehicular Technology Conference* in St. Louis, Mo., May 19–22, 1991, pp. 57–62.

"The Weight Spectra of Some Short Low-Rate Convolutional Codes", Jean Conan, *IEEE Transactions on Communications*, vol. COM-32, No. 9 (Sep. 1984), pp. 1050–1053.

"Performance of Convolutional Codes with Interleaving in the Interference Limited Rayleigh Fading Channel", Li Fung Chang and Sirikiat Ariyavisitaskul, *Proceedings of 41st Vehicular Technology Conference* in St. Louis, Mo., May 19–22, 1991, pp. 812–816.

"CDMA Power Control For Wireless Networks", Jack M. Holtzman, *Proceedings of 2nd WINLAB Workshop on 3rd Generation Wireless Interface Networks* in East Brunswick, N.J., Oct. 1990, pp. 264–273.

"CDMA Power Control, Interleaving, and Coding", Floyd Simpson and Jack Holtzman, *Proceedings of ICC '91*, pp. 362–367.

*Primary Examiner*—Gilberto Barron, Jr.
*Attorney, Agent, or Firm*—Shawn B. Dempster

[57] ABSTRACT

A method and apparatus is provided for estimating signal power. The estimating is accomplished by correlating (206) an input data vector (204) with a set of mutually orthogonal codes to generate a set of output values. The input data vector (204) consists of data samples of a received orthogonal coded signal (202). Each output value corresponds to a measure of confidence that the input data vector is substantially similar to one of the orthogonal codes from within the set of mutually orthogonal codes. Finally, an estimate of the power of the received orthogonal coded signal is generated (208) as a nonlinear function of the set output values.

26 Claims, 3 Drawing Sheets

METHOD AND APPARATUS FOR POWER ESTIMATION IN AN ORTHOGONAL CODED COMMUNICATION SYSTEM

FIELD OF THE INVENTION

The present invention relates to communication systems which employ orthogonally coded signals and, more particularly, to a method and apparatus for signal power estimation in an orthogonal coded communication system.

BACKGROUND OF THE INVENTION

Communication systems take many forms. In general, the purpose of a communication system is to transmit information-bearing signals from a source, located at one point, to a user destination, located at another point some distance away. A communication system generally consists of three basic components: transmitter, channel, and receiver. The transmitter has the function of processing the message signal into a form suitable for transmission over the channel. This processing of the message signal is referred to as a modulation. The function of the channel is to provide a physical connection between the transmitter output and the receiver input. The function of the receiver is to process the received signal so as to produce an estimate of the original message signal. This processing of the received signal is referred to as demodulation.

Two types of two-way communication channels exist, namely, point-to-point channels and point-to-multipoint channels. Examples of point-to-point channels include wirelines (e.g., local telephone transmission), microwave links, and optical fibers. In contrast, point-to-multipoint channels provide a capability where many receiving stations may be reached simultaneously from a single transmitter (e.g. cellular radio telephone communication systems). These point-to-multipoint systems are also termed Multiple Address Systems (MAS).

Analog and digital transmission methods are used to transmit a message signal over a communication channel. The use of digital methods offers several operational advantages over analog methods, including but not limited to: increased immunity to channel noise and interference, flexible operation of the system, common format for the transmission of different kinds of message signals, improved security of communication through the use of encryption, and increased capacity.

These advantages are attained at the cost of increased system complexity. However, through the use of very large-scale integration (VLSI) technology a cost-effective way of building the hardware has been developed.

To transmit a message signal (either analog or digital) over a band-pass communication channel, the message signal must be manipulated into a form suitable for efficient transmission over the channel. Modification of the message signal is achieved by means of a process termed modulation. This process involves varying some parameter of a carrier wave in accordance with the message signal in such a way that the spectrum of the modulated wave matches the assigned channel bandwidth. Correspondingly, the receiver is required to recreate the original message signal from a degraded version of the transmitted signal after propagation through the channel. The re-creation is accomplished by using a process known as demodulation, which is the inverse of the modulation process used in the transmitter.

In addition to providing efficient transmission, there are other reasons for performing modulation. In particular, the use of modulation permits multiplexing, that is, the simultaneous transmission of signals from several message sources over a common channel. Also, modulation may be used to convert the message signal inot a form less susceptible to noise and interference.

For multiplexed communication systems, the system typically consists of many remote units (i.e. subscriber units) which require active service over a communication channel for a short or discrete portion of the communication channel resource rather than continuous use of the resources on a communication channel. Therefore, communication systems have been designed to incorporate the characteristic of communicating with many remote units for brief intervals on the same communication channel. These systems are termed multiple access communication systems.

One type of multiple access communication system is a spread spectrum system. In a spread spectrum system, a modulation technique is utilized in which a transmitted signal is spread over a wide frequency band within the communication channel. The frequency band is much wider than the minimum bandwidth required to transmit the information being sent. A voice signal, for example, can be sent with amplitude modulation (AM) in a bandwidth only twice that of the information itself. Other forms of modulation, such as low deviation frequency modulation (FM) or single sideband AM, also permit information to be transmitted in a bandwidth comparable to the bandwidth of the information itself. However, in a spread spectrum system, the modulation of a signal to be transmitted often includes taking a baseband signal (e.g., a voice channel) with the bandwidth of only a few kilohertz, and distributing the signal to be transmitted over a frequency band that may be many megahertz wide. This is accomplished by modulating the signal to be transmitted with the information to be sent and with a wideband encoding signal.

Three general types of spread spectrum communication techniques exist, including:

Direct Sequence

The modulation of a carrier by a digital code sequence whose bit rate is much higher than the information signal bandwidth. Such systems are referred to as "direct sequence" modulated systems.

Hopping

Carrier frequency shifting in discrete increments in a pattern dictated by a code sequence. These systems are called "frequency hoppers." The transmitter jumps from frquency to frequency within some predetermined set; the order of frequency usage is determined by a code sequence. Similarly "time hopping" and "time-frequency hopping" have times of transmission which are regulated by a code sequence.

Chirp

Pulse-FM or "chirp" modulation in which a carrier is swept over a wide band during a given pulse interval.

Information (i.e. the message signal) can be embedded in the spread spectrum signal by several methods. One method is to add the information to the spreading code before it is used for spreading modulation. This technique can be used in direct sequence and frequency hopping systems. It will be noted that the information being sent must be in a digital form prior to adding it to the spreading code, because the combination of the spreading code and the information typically a binary code involves module-2 addition. Alternatively, the information or message signal may be used to modulate a carrier before spreading it.

Thus, a spread spectrum system must have two properties: (1) the transmitted bandwidth should be much greater than the bandwidth or rate of the information being sent and (2) some function other than the information being sent is employed to determine the resulting modulated channel bandwidth.

Spread spectrum communication systems can be multiple access systems communication systems. One type of multiple access spread spectrum system is a code division multiple access (CDMA) system. In a CDMA system, communication between two communication units is accomplished by spreading each transmitted signal over the frequency band of the communication channel with a unique user spreading code. As a result, transmitted signals are in the same frequency band of the communication channel and are separated only by unique user spreading codes. These unique user spreading codes preferably are orthogonal to one another such that the cross-correlation between the spreading codes is approximately zero. CDMA systems may use direct sequence or frequency hopping spreading techniques. Particular transmitted signals can be retrieved from the communication channel by despreading a signal representative of the sum of signals in the communication channel with a user spreading code related to the particular transmitted signal which is to be retrieved from the communication channel. Further, when the user spreading codes are orthogonal to one another, the received signal can be correlated with a particular user spreading code such that only the desired user signal related to the particular spreading code is enhanced while the other signals for all of the other users are not enhanced.

It will be appreciated by those skilled in the art that several different spreading codes exist which can be used to separate data signals from one another in a CDMA communication system. These spreading codes include but are not limited to pseudonoise (PN) codes and Walsh codes. A Walsh code corresponds to a single row or column of the Hadamard matrix. For example, in a 64 channel CDMA spread spectrum system, particular mutually orthogonal Walsh codes can be selected from the set of 64 Walsh codes within a 64 by 64 Hadamard matrix. Also, a particular data signal can be separated from the other data signals by using a particular Walsh code to spread the particular data signal.

Further it will be appreciated by those skilled in the art that spreading codes can be used to channel code data signals. The data signals are channel coded to improve performance of the communication system by enabling transmitted signals to better withstand the effects of various channel impairments, such as noise, fading, and jamming. Typically, channel coding reduces the probability of bit error, and/or reduces the required signal to noise ratio usually expressed as bit energy per noise density ($E_b/N_0$), to recover the signal at the cost of expending more bandwidth than would otherwise be necessary to transmit the data signal. For example, Walsh codes can be used to channel code a data signal prior to modulation of the data signal for subsequent transmission. Similarly PN spreading codes can be used to channel code a data signal.

A typical spread spectrum transmission involves expanding the bandwidth of an information signal, transmitting the expanded signal and recovering the desired information signal by remapping the received spread spectrum into the original information signals bandwidth. This series of bandwidth trades used in spread spectrum signaling techniques allows a communication system to deliver a relatively error-free information signal in a noisy signal environment or communication channel. The quality of recovery of the transmitted information signal from the communication channel is measured by the error rate (i.e., the number of errors in the recovery of the transmitted signal over a particular time span or received bit span) for some $E_b/N_0$. As the error rate increases the quality of the signal received by the receiving party decreases. As a result, communication systems typically are designed to limit the error rate to an upper bound or maximum so that the degradation in the quality of the received signal is limited.

In CDMA spread spectrum communication systems, the error rate is related to the noise interference level in the communication channel which is directly related to number of simultaneous but code divided users within the communication channel. Thus, in order to limit the maximum error rate, the number of simultaneous code divided users in the communication channel is limited. However, the error rate is also affected by the received signal power level. In some spread spectrum communication systems (e.g., cellular systems) a central communication site typically attempts detect or receive more than one signal from a particular band of the electromagnetic frequency spectrum. The central communication site adjusts the receiver components to optimally receive signals at a particular received signal power threshold value. Those received signals having a received signal power level at or near the particular power threshold level are optimally received. While those received signals not having a received signal power level at or near the particular power threshold level are not optimally received. A non-optimally received signal tends to have a higher error rate or cause unnecessary interference to other receivers. Either of these undesirable consequences of a non-optimally received signal can result in the communication system further limiting the number of simultaneous users in the communication channel associated with the central communication site. Thus, it is desirable to maintain the received signal power level at or near the particular power threshold level. This can be accomplished by adjusting the signal power level of transmitters attempting to transmit to the central communication site. Therefore, by using power control schemes to maintain the received signal power levels at a particular power threshold level the number of simultaneous users in a communication channel can be maximized for a particular maximum error rate limit. However, a need exists for a more accurate received signal power level estimation scheme for use in CDMA spread spectrum communication systems. Through the use of a more accurate received signal power level estimation scheme, the number of simultaneous users in a communication channel can be increased over the number of simultaneous users in a communication channel using less accurate received signal power level estimation scheme while maintaining the same maximum error rate limit.

Summary of the Invention

A method and apparatus is provided for estimating signal power. The estimating is accomplished by correlating an input data vector with a set of mutually orthogonal codes to generate a set of output values. The input data vector consists of data samples of a received orthogonal coded signal. Each output value corresponds to a measure of confidence that the input data vector is substantially similar to one of the orthogonal codes from within the set of mutually orthogonal codes. Finally, an estimate of the power of the received orthogonal coded signal is generated as a nonlinear function of the set of output values.

DETAILED DESCRIPTION

Figure 1:
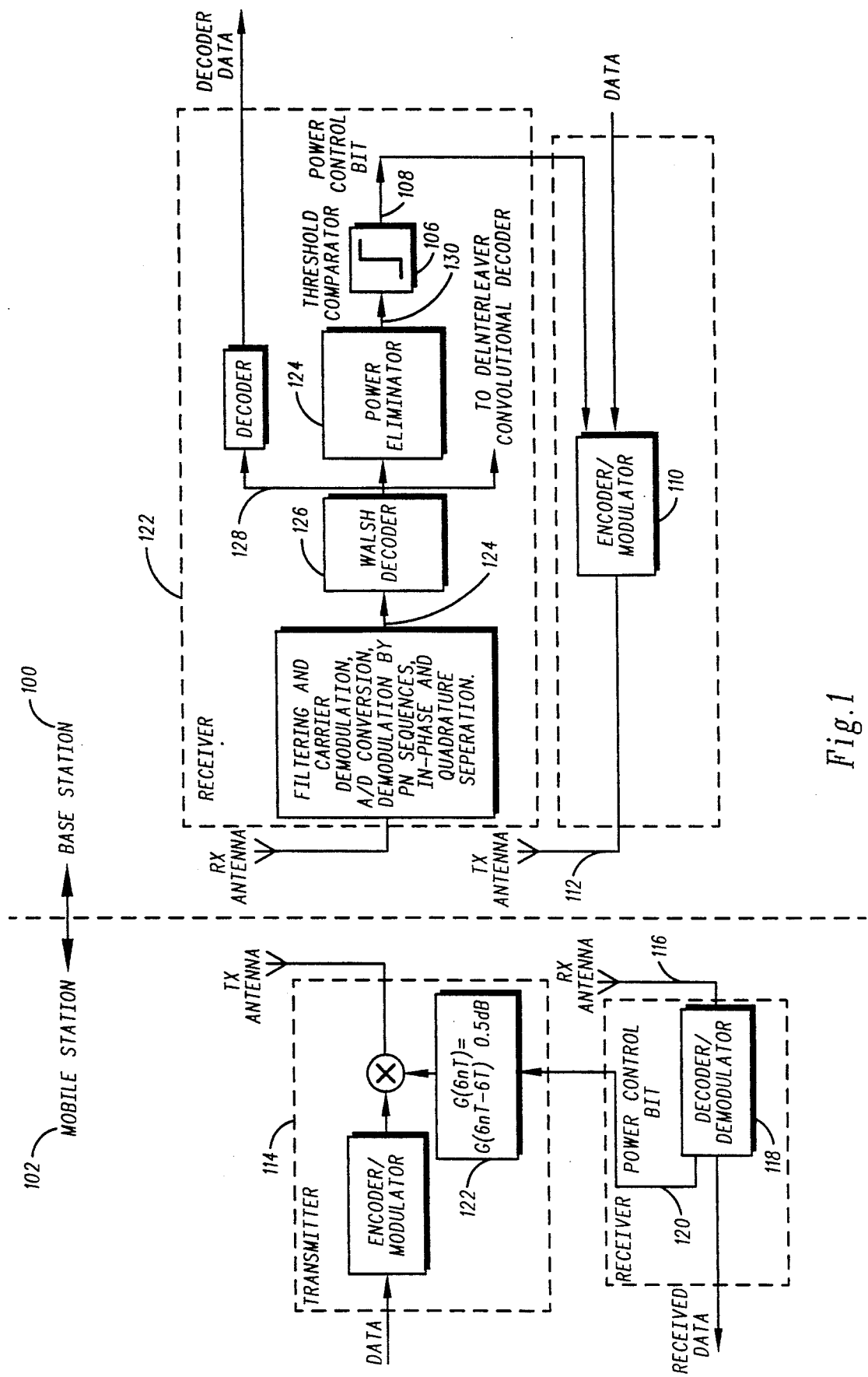
FIG. 1 is a block diagram showing a preferred embodiment communication system which uses orthogonal coding and power control.

Referring now to FIG. 1, a preferred embodiment closed-loop power control system in a communication system is shown. The power control system is for a reverse channel (i.e., the base communication site 100 adjusts the transmit signal power of the mobile station 102). The base station 100 receiver estimates the received signal power transmitted by the mobile station 102 of a particular user. In the preferred embodiment, power is preferably estimated 104 every 1.25 milliseconds (ms), i.e., during the time period of 6 Walsh words. Several power estimates can be averaged together to get a long term average power estimate. The power estimate is compared 106 to a predetermined threshold. A control indicator (e.g., a bit or plurality of bits) is generated 108 based on the result of comparison. If the estimate is larger than the threshold, the power control indicator is set to be one. Otherwise it is set to be zero. The power control indicator is encoded 110 and transmitted 112 via the forward channel. The encoding may include spreading the power control indicator with a spreading code prior to transmission over the communication channel. To reduce the burden to the forward channel, preferably only one power control indicator is transmitted every 1.25 ms. As a result, the mobile station 102 detects the power control indicator from within a signal received from over the communication channel and subsequently will either increase or decrease 122 its transmitter 114 power every 1.25 ms according to the power control indicator 120 received. The detection of the power control indicator may involve despreading the received signal with a spreading code. The transmitter 114 will increase the transmission power if the delayed control indicator is a zero. Otherwise, it 114 will decrease the transmission power. The step of power increase or decrease preferably is between 0.2 to 1.3 dB, and the power change within every 12.5 ms is held to less than 10 dB. The time delay of the mobile station 102 response after receiving the power control indicator should be no larger than 2 ms.

From the above description, it can be seen that the power control system is a nonlinear feedback control system with delay. The purpose of such a control system should be to track the instantaneous received signal power change if possible. It should also maintain the average received signal power on a fixed level when the instantaneous power tracking cannot be achieved. Obviously, if all the average mobile transmitter's 102 powers at the base station 100 receiver input are equal to each other, the signal to noise ratio of a particular mobile station 102 can be maintained above a pre specified value by not allowing the number of mobile stations in the cell to exceed a certain limit. The signal to nose ratio can be maintained in this manner because the noise, or interference, for a particular received signal is mainly due to signals from other mobile stations. If all the average receiver signal power levels are the same, then the signal to noise ratio at the input of any receiver is simply equal to $10\log_{10}N$ (dB), where N is the effective number of transmitting mobile stations.

Although it is possible to performing power control based on the signal to noise ratio for a particular receiver, a power control system solely based on signal to noise ratio may become unstable. More precisely, if the received signal for one mobile station is interference for others, then increased transmitter power from one mobile station means increased interference for the received signals from other mobile stations. Namely, adjustment of one mobile station's power will affect the signal to noise ratio of other mobile stations. It will be very difficult to select a desired signal to noise ratio value for all the mobile stations. Even if this is possible, such a system will be unstable. For instance, assume that mobile station A's signal power is increased for some reason. That station's power increase will cause a decrease in the signal to noise ratio in all of the received signals from other mobile stations. To maintain a proper signal to noise ratio, these mobile stations must increase their transmitter powers and this will cause mobile station A to increase it's power again. This obviously forms an unstable positive feedback loop.

The performance of the power control system greatly depends on the performance of the received signal power estimator. Thus, an improved power estimator would be highly desirable. A demodulated received signal 124 contains several signals transmitted by mobile stations 102. However, the signal to noise ratios for any one of the received mobile station signals are so small that estimating the received signal power can be quite difficult. As a result, the received signal power estimation should be determined by using another signal source such as the signal output by the Walsh decoder 126. The Walsh decoder 126 is essentially a correlator, which correlates 64 different (mapped) Walsh words (i.e., orthogonal codes) with the input data vector (i.e., demodulated received signal 124). By assuming that the input data vector r(n) at time nT, where T is the Walsh word interval, is generated by the i-th Walsh word. The input data vector r(n) can be written as:

$$r(n) = A_n e^{j\theta_n} w_i + z(n) \qquad \text{(eq. 1)}$$

where, z(n) = the noise vector at time nT, $w_i$ = a 64 bit length data vector derived from the i-th Walsh word by mapping the elements 0 and 1 of the Walsh word into +1 and −1, $A_n$ = the channel gain, and $\theta_n$ = the modulation angle that is unknown in the case of noncoherent detection.

The Walsh decoder 126 outputs 64 values 128 according to a Hadamard transform matrix algorithm. The complex output values 128 $y_j(n)$, j=0, 1, ..., 63, can be written as:

$$y_j(n) = 64 A_n e^{j\theta_n} + u_j(n) \quad \text{for } j = i \qquad \text{(eq. 2a)}$$

-continued $$y_j(n) = u_j(n) \quad \text{for } j \neq i \quad \text{(eq. 2b)}$$

where,
$u_j(n)$ = a scalar white noise.

When $u_j(n)$ has zero mean, the expectation value $E_j(n)$ of the squared magnitude of $y_j(n)$ scaled by 1/64 can be expressed as:

$$E_j(n) = E\left[\left|\frac{y_j(n)}{64}\right|^2\right] = \quad \text{(eq. 3a)}$$

$$A_n^2 + \text{Real}\left\{E\left[\frac{A_n u_j(n)}{32}\right]\right\} + E\left[\left|\frac{u_j(n)}{64}\right|^2\right]$$

$$= A_n^2 + \sigma_n^2 \quad \text{for } j = i$$

$$E_j(n) = \sigma_n^2 \quad \text{for } j \neq i \quad \text{(eq. 3b)}$$

where, $\sigma_n^2$ = the variance or power of $\frac{u_j(n)}{64}$.

We note that $A_n^2$ in (eq. 3) is the power of the demodulated received signal 124. It should be noted that to compute an estimate of the received signal 124 power, the identity of the particular Walsh word which was transmitted must be known. Although this is not typically known at the receiver 122, the largest output value $y_i(n)$ from a group of 64 output values 128 output by Walsh decoder 126, denoted as $y_i(n)$ can be used to generate an estimate of the expectation value $E_i(n)$. In addition, the other output values $y_j(n)$ 128 can be used to estimate the noise variance/power $\hat{\theta}_n^2$. Thus, power estimator 104 can obtain a power estimate, denoted by P(n) by calculating an estimate of the expectation value $E_i(n)$ and the noise variance estimate $\hat{\theta}_n^2$ and using them in a power estimation equation, such that:

$$E_i(n) = \left|\frac{y_i(n)}{64}\right|^2 \quad \text{(eq. 4)}$$

$$\hat{\sigma}_n^2 = \frac{1}{63} \sum_{j=0, j \neq i}^{63} \left|\frac{y_j(n)}{64}\right|^2 = \frac{1}{63} \sum_{j=0, j \neq i}^{63} E_j(n) \quad \text{(eq. 5)}$$

where, $n$ = a moment in time,
$y_j(n)$ = a particular output value at time $n$,
$y_i(n)$ = the largest output value at time $n$,
$E_i(n)$ = an estimate of the expectation value of a function of $y_i(n)$ at time $n$,
$E_j(n)$ = an estimate of the expectation value of a function of $y_j(n)$ at time $n$, and
$\hat{\sigma}_n^2$ = the noise variance estimate at time $n$.

Hence, the instantaneous power estimate P(n) of the demodulated received signal 124, also denoted as $\hat{A}_n^2$, at time n can be obtained as:

$$\hat{A}_n^2 = \left|\frac{y_i(n)}{62}\right|^2 \left[1 - \frac{1}{63} \sum_{j=0, j \neq i}^{63} \left|\frac{y_j(n)}{64}\right|^2 / \left|\frac{y_i(n)}{64}\right|^2\right] \quad \text{(eq. 6)}$$

$$= E_i(n)\left[1 - \frac{1}{63} \sum_{j=0, j \neq i}^{63} \left|\frac{y_j(n)}{64}\right|^2 / E_i(n)\right]$$

$$= E_i(n)[1 - \hat{\sigma}_n^2 / E_i(n)]$$

where,
$n$ = a moment in time,
$y_j(n)$ = a particular output value at time n,
$y_i(n)$ = the largest output value at time n,
$E_i(n)$ = an estimate of the expectation value of a function of $y_i(n)$ at time n, and
$\hat{\theta}_n^2$ = the noise variance estimate at time n, and
$\hat{A}_n^2$ = signal power estimate at time n.

It will be appreciated by those skilled in the art that a long term average power estimate, denoted by $\overline{P}(n)$, may be obtained. In addition to performing the calculations shown in (eq. 4) and (eq. 5), six consecutive estimates of the expectation values $E_i(n)$ and noise variance estimate $\sigma_n^2$ may be averaged for use in a power estimation equation, such that;

$$\overline{E_i(n)} = \frac{1}{6} \sum_{k=0}^{5} \left|\frac{y_i(n-k)}{64}\right|^2 = \frac{1}{6} \sum_{k=0}^{5} E_i(n-k) \quad \text{(eq. 7)}$$

$$\overline{\hat{\sigma}_n^2} = \frac{1}{6} \sum_{k=0}^{5} \frac{1}{63} \sum_{j=0, j \neq i}^{63} \left|\frac{y_j(n-k)}{64}\right|^2 = \frac{1}{6} \sum_{k=0}^{5} \hat{\sigma}_{(n-k)}^2 \quad \text{(eq. 8)}$$

where,
$n$ = a moment in time,
$y_j(n)$ = a particular output value at time n,
$y_i(n)$ = the largest output value at time n,
$E_i(n)$ = an estimate of the expectation value of a function of $y_i(n)$ at time n, and
$\hat{\sigma}_n^2$ = the noise variance estimate at time n,
$\overline{E_i(n)}$ = the long term average of the estimate of the expectation value of a function of $y_i(n)$ at time n, and
$\overline{\hat{\sigma}_n^2}$ = the long term average noise variance estimate at time n.

Thus, the long term average power estimation equation can be written as:

$$\overline{\hat{A}_n^2} = \frac{1}{6} \sum_{k=0}^{5} \left|\frac{y_i(n-k)}{64}\right|^2 \left[1 - \frac{\frac{1}{6} \sum_{k=0}^{5} \frac{1}{63} \sum_{j=0, j \neq i}^{63} \left|\frac{y_j(n-k)}{64}\right|^2}{\frac{1}{6} \sum_{k=0}^{5} \left|\frac{y_i(n-k)}{64}\right|^2}\right] \quad \text{(eq. 9)}$$

$$= \overline{E_i(n)} \left[1 - \frac{\overline{\hat{\sigma}_n^2}}{\overline{E_i(n)}}\right]$$

where,
$n$ = a moment in time,
$y_j(n)$ = a particular output value at time n,
$y_i(n)$ = the largest output value at time n,
$\overline{E_i(n)}$ = the long term average of the estimate of the expectation value of a function of $y_i(n)$ at time n, $\overline{\sigma_n^2}$ = the long term average noise variance estimate at time n, and
$\overline{A_n^2}$ = the long term average signal power estimate at time n.

Figure 2:
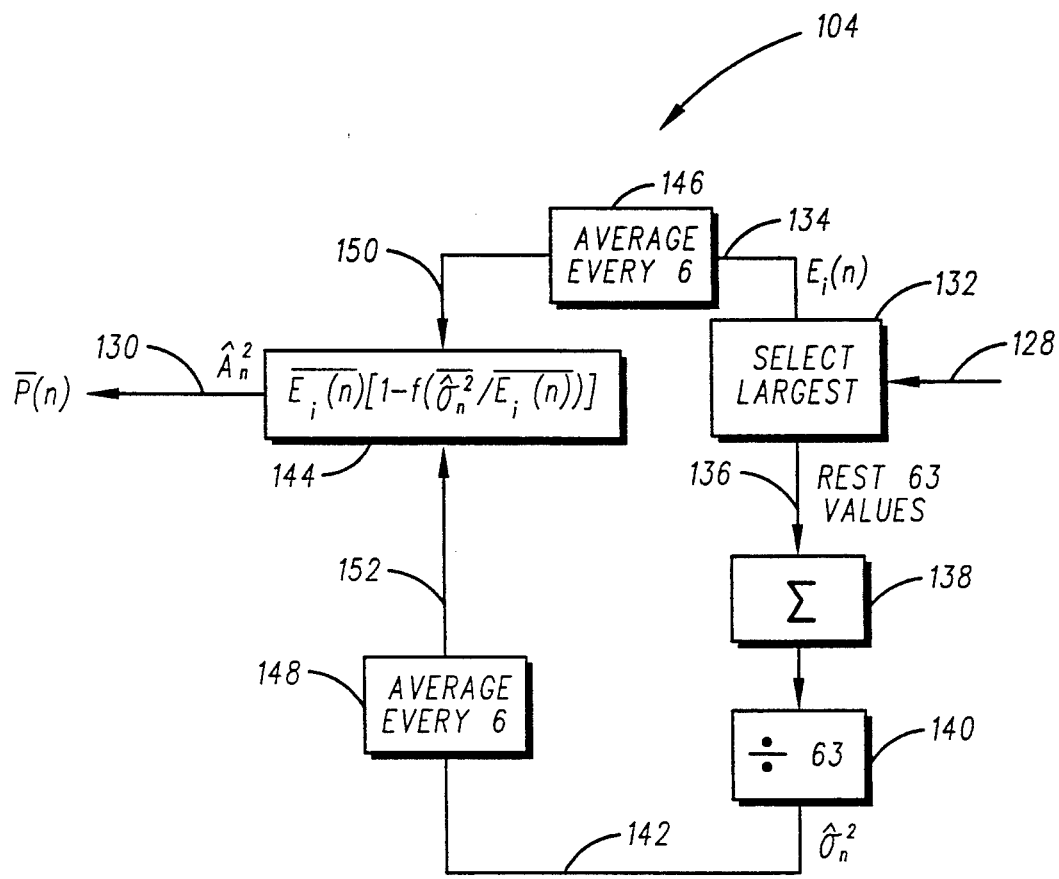
FIG. 2 is a block diagram showing a preferred embodiment power estimator apparatus.

Referring now to FIG. 2, these unbiased estimates of the signal power $\hat{A}_n^2$, and the noise variance $\hat{\sigma}_n^2$ can be used for power control. In addition, these estimates can be used to evaluate each received mobile station's 102 signal to noise ratio. However as previously noted, to compute these estimates, the identity of the particular Walsh word which was transmitted must be known. In addition, although this is not typically known at the receiver 122, the largest output valve $y_j(n)$ 128, for all j, denoted as $y_i(n)$ can be selected 132 to generate the estimate of the expectation value $E_i(n)$ 134. Further, the other output values 136 can be used to estimate the noise variance/power $\hat{\sigma}_n^2$. 142. The noise power $\hat{\sigma}_n^2$ 142 is generate by summing 138 and dividing by 63 the remaining output values 136. Subsequently, several estimates of expectation values $E_i(n)$ 134 and the noise powers 142 $\hat{\sigma}_n^2$ (e.g., every six expectation values and noise powers) are averaged 146 and 148, respectively. Finally, the average estimate expectation value $\overline{E_i(n)}$ 150 and the average noise power estimate 152 $\overline{\hat{\sigma}_n^2}$ are used to compute 144 a long term average signal power estimate $\overline{P(n)}$ 130 (i.e., $\overline{A_n^2}$), according to a function such as that shown in (eq. 6) and (eq. 9).

When the receiver 122 signal to noise ratio is large, such a decision to select the largest output value 128 is reliable and the estimates of the signal and noise power are accurate. However, when the signal to noise ratio diminishes, then the signal power tends to be overestimated. When the signal to noise ratio is low, then the determined estimate $E_i(n)$ could be erroneous, namely, the output value $y_i(n)$ 128 with the largest magnitude is not the correlation of the mapping of the transmitted Walsh word with the received signal vector. In other words, the true estimate $E_i(n)$ must have a smaller value than the selected estimate $E_i(n)$ and the true average signal power must be smaller that the average of the estimated values based on the erroneous decisions. A better power estimate under low signal to noise ratio conditions can be obtained by modifying (eq. 6) to become:

$$\hat{A}_n^2 = \left|\frac{y_i(n)}{64}\right|^2 \left[1 - f\left(\frac{1}{63} \sum_{j=0, j \neq i}^{63} \left|\frac{y_j(n)}{64}\right|^2 / \left|\frac{y_i(n)}{64}\right|^2\right)\right] \quad \text{(eq. 10)}$$

where, $$f\left(\frac{1}{63} \sum_{j=0, j \neq i}^{63} \left|\frac{y_j(n)}{64}\right|^2 / \left|\frac{y_i(n)}{64}\right|^2\right)$$

is a nonlinear function of the signal to noise ratio.

According to the discussion given above, this nonlinear function f(x) must satisfy: f(x)=x for a small x, and f(x)>x for a large x. One such function is:

$$0.75 \left(\frac{1}{63} \sum_{j=0, j \neq i}^{63} \left|\frac{y_j(n)}{64}\right|^2 / \left|\frac{y_i(n)}{64}\right|^2\right) + \quad \text{(eq. 11)}$$

$$3.5 \left(\frac{1}{63} \sum_{j=0, j \neq i}^{63} \left|\frac{y_j(n)}{64}\right|^2 / \left|\frac{y_i(n)}{64}\right|^2\right)^2.$$

By using such a nonlinear function (eq. 11), a better power estimator 104 can be provided by implementing the following function:

$$\hat{A}_n^2 = \left|\frac{y_i(n)}{64}\right|^2 - \quad \text{(eq. 12)}$$

$$0.75 \left|\frac{y_i(n)}{64}\right|^2 \left(\frac{1}{63} \sum_{j=0, j \neq i}^{63} \left|\frac{y_j(n)}{64}\right|^2 / \left|\frac{y_i(n)}{64}\right|^2\right) +$$

$$3.5 \left|\frac{y_i(n)}{64}\right|^2 \left(\frac{1}{63} \sum_{j=0, j \neq i}^{63} \left|\frac{y_j(n)}{64}\right|^2 / \left|\frac{y_i(n)}{64}\right|^2\right)^2.$$

It will be appreciated by those skilled in the art that another nonlinear function could be substituted for the one shown in (eq. 11) to produce a different signal power estimate 130 without departing from the scope of the present invention. In addition, a nonlinear function such as the one described in (eq. 11) may also be applied to modify the long term average signal power estimate described in (eq. 9) to provide an even better signal power estimate P(n) by implementing the following function in power estimator 104:

$$\hat{A}_n^2 = \left|\frac{y_i(n)}{64}\right|^2 - \quad \text{(eq. 13)}$$

$$0.75 \left|\frac{y_i(n)}{64}\right|^2 \left(\frac{\frac{1}{6} \sum_{k=0}^{5} \frac{1}{63} \sum_{j=0, j \neq i}^{63} \left|\frac{y_j(n-k)}{64}\right|^2}{\frac{1}{6} \sum_{k=0}^{5} \left|\frac{y_i(n-k)}{64}\right|^2}\right) +$$

$$3.5 \left|\frac{y_i(n)}{64}\right|^2 \left(\frac{\frac{1}{6} \sum_{k=0}^{5} \frac{1}{63} \sum_{j=0, j \neq i}^{63} \left|\frac{y_j(n-k)}{64}\right|^2}{\frac{1}{6} \sum_{k=0}^{5} \left|\frac{y_i(n-k)}{64}\right|^2}\right).$$

Figure 3:
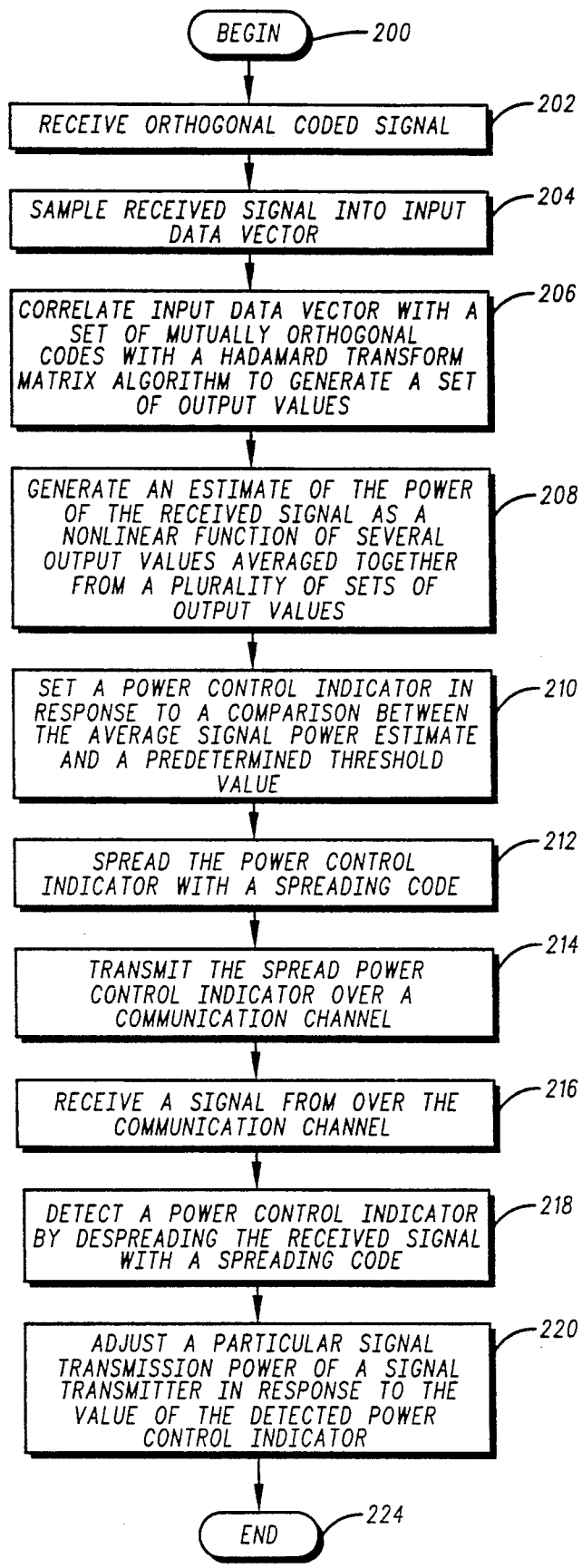
FIG. 3 is flowchart detailing the power estimation steps performed by the preferred embodiment communication system of FIGS. 1 and 2.

Thus, a communication system for using an improved signal power estimate has been described above with reference to FIGS. 1 and 2. A flowchart which summarizes the steps performed by the power control system shown in FIGS. 1 and 2 is shown in FIG. 3. The signal power control system begins 200 by receiving an orthogonally coded signal 202 at the base station 100 receiver 122. The received orthogonally coded signal is sampled/demodulated 204 into an input data vector 124. The input data vector 124 is correlated 126, 206 with a set of mututally orthogonal codes with a Hadamard transform matrix algorithm to generate a set of output values 128. Subsequently, an estimate of the power of the received signal $\overline{P(n)}$ is generated 104, 208 as a nonlinear function of several output values 128 averaged together from a plurality of sets of output values 128 according to a predetermined equation (e.g.

eq. 6, eq. 9, or eq. 12 described above). Subsequently a power control indicator 108 is set 210 in response to a comparison between the average signal power estimate $\bar{P}(n)$ and a predetermined power control threshold. The power control indicator 108 is spread 110, 212 with a spreading code. The spread power control indicator 108 is transmitted 112, 214 over a communication channel. Subsequently, a mobile station 102 receives 116, 216 a signal from over the communication channel. A power control indicator 120 is detected 118, 318 by despreading the received signal with a spreading code. A particular signal transmission power of a signal transmitter 114 is adjusted 122, 220 in response to the value of the detected power control indicator 120 which completes or ends 224 one loop of the preferred embodiment power control system.

Although the invention has been described and illustrated with a certain degree of particularity, it is understood that the present disclosure of embodiments has been made by way of example only and that numerous changes in the arrangement and combination of parts as well as steps may be resorted to by those skilled in the art without departing from the spirit and scope of the invention as claimed. For example, the modulator, antennas and demodulator portions of the preferred embodiment communication system power control scheme as described were directed to CDMA spread spectrum signals transmitted over a radio communication channel. However, as will be understood by those skilled in the art, the power control techniques described and claimed herein can also be adapted for use in other types of transmission systems like those based on TDMA and FDMA. In addition the communication channel could alternatively be an electronic data bus, wireline, optical fiber link, or any other type of communication channel.

What is claimed is:

1. An apparatus comprising a signal power estimator, the signal power estimator comprising:
   (a) orthogonal code detector means for correlating an input data vector with a set of mutually orthogonal codes to generate a set of output values, the input data vector comprising data samples of a received orthogonal coded signal, each output value corresponding to a measure of confidence that the input data vector is substantially similar to one of the orthogonal codes from within the set of mutually orthogonal codes; and
   (b) estimating means, operatively coupled to the orthogonal code detector means, for generating an estimate of the power of the received orthogonal coded signal as a nonlinear function of the set of output values.

2. The apparatus of claim 1 wherein the orthogonal code detector means generates the set of output values by utilizing a Hadamard transform matrix algorithm on the input data vector.

3. The apparatus of claim 1 wherein the estimating means comprises averaging means for averaging output values together from a plurality of sets of output values such that the signal power estimate is generated as a nonlinear function of the set of average output values.

4. The apparatus of claim 1 further comprising a threshold means, operatively coupled to the signal power estimator, for setting a power control indicator in response to the result of a comparison between the signal power estimate and a predetermined threshold.

5. The apparatus of claim 4 further comprising a signal transmitting means, operatively coupled to the threshold means, for transmitting the power control indicator over a communication channel.

6. The apparatus of claim 5 wherein the signal transmitting means comprises means for preparing the power control indicator for transmission over the communication channel by spreading the power control indicator with a spreading code prior to transmission over the communication channel.

7. The apparatus of claim 5 wherein the communication channel is selected from the group consisting essentially of an electronic data bus, radio communication link, wireline and optical fiber link.

8. The apparatus of claim 5 further comprising:
   (a) signal receiving means for detecting a power control indicator within a signal received from over the communication channel; and
   (b) power adjustment means, operatively coupled to the signal receiving means, for adjusting a particular signal transmission power of a signal transmitter in response to the detected power control indicator.

9. The apparatus of claim 8 wherein the signal receiving means comprises means for despreading the received signal with a spreading code to detect the power control indicator.

10. The apparatus of claim 1 wherein:
    (a) the signal power estimator orthogonal code detector means correlates the input data vector with a set of 64 mutually orthogonal codes to generate a set of 64 output values; and
    (b) the signal power estimator estimating means generates the signal power estimate according to the following function:

$$\hat{A}_n^2 = \left| \frac{y_i(n)}{64} \right|^2 \left[ 1 - f\left( \frac{1}{63} \sum_{j=0, j \neq i}^{63} \left| \frac{y_j(n)}{64} \right|^2 \Big/ \left| \frac{y_i(n)}{64} \right|^2 \right) \right]$$

where, n = a moment in time;
$y_j(n)$ = a particular output value at time n;
$y_i(n)$ = the largest output value at time n;
$\hat{A}_n^2$ = signal power estimate at time n; and
f( ) = a particular nonlinear function.

11. The apparatus of claim 10 wherein the signal power estimator estimating means comprises averaging means for averaging particular output values together from six sets of output values such that the signal power estimate is generated according to the following function:

$$\overline{\hat{A}_n^2} = \frac{1}{6} \sum_{k=0}^{5} \left| \frac{y_i(n-k)}{64} \right|^2 \left[ 1 - f\left( \frac{\frac{1}{6} \sum_{k=0}^{5} \frac{1}{63} \sum_{j=0,j\neq i}^{63} \left| \frac{y_j(n-k)}{64} \right|^2}{\frac{1}{6} \sum_{k=0}^{5} \left| \frac{y_i(n-k)}{64} \right|^2} \right) \right]$$

where,
$\overline{\hat{A}_n^2}$ = the long term average signal power estimate at time n.

12. The apparatus of claim 10 wherein the particular nonlinear function f( ) comprises:

$$0.75 \left( \frac{1}{63} \sum_{j=0,j\neq i}^{63} \left| \frac{y_j(n)}{64} \right|^2 \Big/ \left| \frac{y_i(n)}{64} \right|^2 \right) +$$

$$3.5 \left( \frac{1}{63} \sum_{j=0,j\neq i}^{63} \left| \frac{y_j(n)}{64} \right|^2 \Big/ \left| \frac{y_i(n)}{64} \right|^2 \right)^2.$$

such that the signal power estimator generates the signal power estimate according to the following function:

$$\hat{A}_n^2 = \left| \frac{y_i(n)}{64} \right|^2 -$$

$$0.75 \left| \frac{y_i(n)}{64} \right|^2 \left( \frac{1}{63} \sum_{j=0,j\neq i}^{63} \left| \frac{y_j(n)}{64} \right|^2 \Big/ \left| \frac{y_i(n)}{64} \right|^2 \right) +$$

$$3.5 \left| \frac{y_i(n)}{64} \right|^2 \left( \frac{1}{63} \sum_{j=0,j\neq i}^{63} \left| \frac{y_j(n)}{64} \right|^2 \Big/ \left| \frac{y_i(n)}{64} \right|^2 \right)^2.$$

13. The apparatus of claim 11 wherein the particular nonlinear function f( ) comprises:

$$0.75 \left( \frac{\frac{1}{6} \sum_{k=0}^{5} \frac{1}{63} \sum_{j=0,j\neq i}^{63} \left| \frac{y_j(n-k)}{63} \right|^2}{\frac{1}{6} \sum_{k=0}^{5} \left| \frac{y_i(n-k)}{64} \right|^2} \right) +$$

$$3.5 \left( \frac{\frac{1}{6} \sum_{k=0}^{5} \frac{1}{63} \sum_{j=0,j\neq i}^{63} \left| \frac{y_j(n-k)}{64} \right|^2}{\frac{1}{6} \sum_{k=0}^{5} \left| \frac{y_i(n-k)}{64} \right|^2} \right)^2$$

such that the signal power estimator generates the signal power estimate according to the following function:

$$\hat{A}_n^2 = \left| \frac{y_i(n)}{64} \right|^2 -$$

$$0.75 \left| \frac{y_i(n)}{64} \right|^2 \left( \frac{\frac{1}{6} \sum_{k=0}^{5} \frac{1}{63} \sum_{j=0,j\neq i}^{63} \left| \frac{y_j(n-k)}{64} \right|^2}{\frac{1}{6} \sum_{k=0}^{5} \left| \frac{y_i(n-k)}{64} \right|^2} \right) +$$

$$3.5 \left| \frac{y_i(n)}{64} \right|^2 \left( \frac{\frac{1}{6} \sum_{k=0}^{5} \frac{1}{63} \sum_{j=0,j\neq i}^{63} \left| \frac{y_j(n-k)}{64} \right|^2}{\frac{1}{6} \sum_{k=0}^{5} \left| \frac{y_i(n-k)}{64} \right|^2} \right)^2.$$

14. A method of estimating signal power, comprising:
(a) correlating an input data vector with a set of mutually orthogonal codes to generate a set of output values, the input data vector comprising data samples of a received orthogonal coded signal, each output value corresponding to a measure of confidence that the input data vector is substantially similar to one of the orthogonal codes from within the set of mutually orthogonal codes; and
(b) generating an estimate of the power of the received orthogonal coded signal as a nonlinear function of the set of output values.

15. The method of claim 14 wherein the set of correlating comprises generating the set of output values by utilizing a Hadamard transform matrix algorithm on the input data vector.

16. The method of claim 14 further comprising a step of averaging output values together from a plurality of sets of output values such that the signal power estimate is generated as a nonlinear function of the set of average output values.

17. The method of claim 14 further comprising a step of setting a power control indicator in response to the result of a comparison between the signal power estimate and a predetermined threshold.

18. The method of claim 17 further comprising a step of transmitting the power control indicator over a communication channel.

19. The method of claim 18 wherein the step of transmitting comprises preparing the power control indicator for transmission over the communication channel by spreading the power control indicator with a spreading code prior to transmission over the communication channel.

20. The method of claim 18 wherein the communication channel is selected from the group consisting essentially of an electronic data bus, radio communication link, wireline and optical fiber link.

21. The method of claim 18 further comprising the steps of:
(a) detecting a power control indicator within a signal received from over the communication channel; and (b) adjusting a particular signal transmission power of a signal transmitter in response to the detected power control indicator.

22. The method of claim 21 wherein the step of detecting comprises despreading the received signal with a spreading code to detect the power control indicator.

23. The method of claim 14 wherein:
(a) the input data vector is correlated with a set of 64 mutually orthogonal codes to generate a set of 64 output values; and
(b) the signal power estimate is generated according to the following function:

$$\hat{A}_n^2 = \left|\frac{y_i(n)}{64}\right|^2 \left[1 - f\left(\frac{1}{63}\sum_{j=0,j\neq i}^{63}\left|\frac{y_j(n)}{64}\right|^2 / \left|\frac{y_i(n)}{64}\right|^2\right)\right]$$

where,
n = a moment in time;
$y_j(n)$ = a particular output value at time n;
$y_i(n)$ = the largest output value at time n;
$\hat{A}_n^2$ = signal power estimate at time n; and
f( ) = a particular nonlinear function.

24. The method of claim 23 the step of generating further comprises averaging particular output values together from six sets of output values such that the signal power estimate is generated according to the following function:

$$\overline{\hat{A}_n^2} = \frac{1}{6}\sum_{k=0}^{5}\left|\frac{y_i(n-k)}{64}\right|^2 \left[1 - f\left(\frac{\frac{1}{6}\sum_{k=0}^{5}\frac{1}{63}\sum_{j=0,j\neq i}^{63}\left|\frac{y_j(n-k)}{64}\right|^2}{\frac{1}{6}\sum_{k=0}^{5}\left|\frac{y_i(n-k)}{64}\right|^2}\right)\right]$$

where,
$\overline{\hat{A}_n^2}$ = the long term average signal power estimate at time n.

25. The method of claim 23 wherein the particular nonlinear function f( ) comprises:

$$0.75\left(\frac{1}{63}\sum_{j=0,j\neq i}^{63}\left|\frac{y_j(n)}{64}\right|^2 / \left|\frac{y_i(n)}{64}\right|^2\right) +$$

$$3.5\left(\frac{1}{63}\sum_{j=0,j\neq i}^{63}\left|\frac{y_j(n)}{64}\right|^2 / \left|\frac{y_i(n)}{64}\right|^2\right)^2$$

such that the signal power estimate is generated according to the following function:

$$\hat{A}_n^2 = \left|\frac{y_i(n)}{64}\right|^2 -$$

$$0.75\left|\frac{y_i(n)}{64}\right|^2\left(\frac{1}{63}\sum_{j=0,j\neq i}^{63}\left|\frac{y_j(n)}{64}\right|^2 / \left|\frac{y_i(n)}{64}\right|^2\right) +$$

$$3.5\left|\frac{y_i(n)}{64}\right|^2\left(\frac{1}{63}\sum_{j=0,j\neq i}^{63}\left|\frac{y_j(n)}{64}\right|^2 / \left|\frac{y_i(n)}{64}\right|^2\right)^2.$$

26. The method of claim 24 wherein the particular nonlinear function f( ) comprises:

$$0.75\left(\frac{\frac{1}{6}\sum_{k=0}^{5}\frac{1}{63}\sum_{j=0,j\neq i}^{63}\left|\frac{y_j(n-k)}{64}\right|^2}{\frac{1}{6}\sum_{k=0}^{5}\left|\frac{y_i(n-k)}{64}\right|^2}\right) +$$

$$3.5\left(\frac{\frac{1}{6}\sum_{k=0}^{5}\frac{1}{63}\sum_{j=0,j\neq i}^{63}\left|\frac{y_j(n-k)}{64}\right|^2}{\frac{1}{6}\sum_{k=0}^{5}\left|\frac{y_i(n-k)}{64}\right|^2}\right)^2$$

such that the signal power estimate is generated according to the following function:

$$\hat{A}_n^2 = \left|\frac{y_i(n)}{64}\right|^2 -$$

$$0.75\left|\frac{y_i(n)}{64}\right|^2\left(\frac{\frac{1}{6}\sum_{k=0}^{5}\frac{1}{63}\sum_{j=0,j\neq i}^{63}\left|\frac{y_j(n-k)}{64}\right|^2}{\frac{1}{6}\sum_{k=0}^{5}\left|\frac{y_i(n-k)}{64}\right|^2}\right) +$$

$$3.5\left|\frac{y_i(n)}{64}\right|^2\left(\frac{\frac{1}{6}\sum_{k=0}^{5}\frac{1}{63}\sum_{j=0,j\neq i}^{63}\left|\frac{y_j(n-k)}{64}\right|^2}{\frac{1}{6}\sum_{k=0}^{5}\left|\frac{y_i(n-k)}{64}\right|^2}\right)^2.$$

* * * * *

UNITED STATES PATENT AND TRADEMARK OFFICE
CERTIFICATE OF CORRECTION

PATENT NO. : 5,297,161
DATED : March 22, 1994
INVENTOR(S) : Fuyun Ling

It is certified that error appears in the above-indentified patent and that said Letters Patent is hereby corrected as shown below:

In column 13, line 50 and column 16, line 20: please replace "$y_j(n-k)/63$" with --$y_j(n-k)/64$--.

Signed and Sealed this

Thirteenth Day of September, 1994

Attest:

BRUCE LEHMAN

*Attesting Officer*

*Commissioner of Patents and Trademarks*